US011148350B2

(12) United States Patent
Saito

(10) Patent No.: US 11,148,350 B2
(45) Date of Patent: Oct. 19, 2021

(54) SHAPING SYSTEM, SHAPED OBJECT FORMATION METHOD, AND COMPUTER-READABLE STORAGE MEDIUM

(71) Applicant: CASIO COMPUTER CO., LTD., Tokyo (JP)

(72) Inventor: Minoru Saito, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 123 days.

(21) Appl. No.: 15/715,055

(22) Filed: Sep. 25, 2017

(65) Prior Publication Data

US 2018/0169932 A1 Jun. 21, 2018

(30) Foreign Application Priority Data

Dec. 21, 2016 (JP) .............................. JP2016-247379
Aug. 23, 2017 (JP) .............................. JP2017-160587

(51) Int. Cl.
*B29C 61/04* (2006.01)
*B29C 35/08* (2006.01)
(Continued)

(52) U.S. Cl.
CPC .......... *B29C 61/04* (2013.01); *B29C 35/0805* (2013.01); *B41M 3/06* (2013.01);
(Continued)

(58) Field of Classification Search
CPC ... B29C 61/04; B29C 35/0805; B29C 44/022; B29C 44/08; B29C 2035/0822; B29K 2105/04; B29K 2105/256
See application file for complete search history.

(56) References Cited

U.S. PATENT DOCUMENTS 5,325,781 A * 7/1994 Dupont ................ B41M 3/06
101/170
9,522,490 B2 12/2016 Horiuchi et al.
(Continued)

FOREIGN PATENT DOCUMENTS

CN 1477460 A 2/2004
CN 103182873 A 7/2013
(Continued)

OTHER PUBLICATIONS

Chinese Office Action dated Jan. 18, 2019 (and English translation thereof) issued in counterpart Chinese Application No. 201710957955.X.
(Continued)

*Primary Examiner* — Michael M. Robinson
(74) *Attorney, Agent, or Firm* — Holtz, Holtz & Volek PC

(57) ABSTRACT

A shaping system includes: a printing device that prints an image using predetermined ink on a thermal expansion sheet having a thermal expansion layer on one side; and an expansion device that performs: a drying process of heating the thermal expansion sheet to an extent that allows the thermal expansion layer to maintain a non-expansion state, to dry the image printed by the printing device using the predetermined ink; and an expansion process of, after the drying process, heating the thermal expansion sheet to an extent that allows the thermal expansion layer to expand, to expand the thermal expansion layer.

4 Claims, 15 Drawing Sheets

(51) Int. Cl.
  *B41M 3/06* (2006.01)
  *B29K 105/00* (2006.01)
  *B29K 105/04* (2006.01)
  *B29C 44/08* (2006.01)
  *B29C 44/02* (2006.01)

(52) U.S. Cl.
  CPC ............ *B29C 44/022* (2013.01); *B29C 44/08* (2013.01); *B29C 2035/0822* (2013.01); *B29K 2105/04* (2013.01); *B29K 2105/256* (2013.01)

(56) References Cited

U.S. PATENT DOCUMENTS

| | | |
|---|---|---|
| 2004/0036922 A1 | 2/2004 | Yamada et al. |
| 2013/0168903 A1* | 7/2013 | Horiuchi ............ B29C 44/0461 264/413 |
| 2013/0229478 A1* | 9/2013 | Horiuchi ................ B41M 7/009 347/188 |
| 2015/0070452 A1* | 3/2015 | Motoyanagi ............... B41J 3/60 347/102 |

FOREIGN PATENT DOCUMENTS

| | | | |
|---|---|---|---|
| JP | 54012911 A | | 1/1979 |
| JP | 64028660 A | | 1/1989 |
| JP | H1195024 A | | 4/1999 |
| JP | 2001150812 A | * | 6/2001 |
| JP | 2001150812 A | | 6/2001 |
| JP | 2005088341 A | | 4/2005 |
| JP | 2010188709 A | | 9/2010 |

OTHER PUBLICATIONS

Japanese Office Action dated Dec. 4, 2018 (and English translation thereof) issued in Japanese Application No. 2017-160587.

* cited by examiner

SHAPING SYSTEM, SHAPED OBJECT FORMATION METHOD, AND COMPUTER-READABLE STORAGE MEDIUM

BACKGROUND OF THE INVENTION

1. Field of the Invention

The present invention relates to a shaping system, a shaped object formation method, and a computer-readable storage medium.

2. Description of the Related Art

A stereoscopic image formation technique using an expansion sheet is known as one of the shaping techniques. For example, this technique is used in the production of teaching materials for the visually impaired such as braille. Japanese Patent Application Laid-Open No. 2001-150812 (Patent Document 1) and Japanese Patent Application Laid-Open No. S64-28660 (Patent Document 2) disclose techniques of partially heating a thermal expansion sheet obtained by stacking a thermal expansion layer on a base material, to form a stereoscopic image (shaped object).

The techniques described in Patent Documents 1 and 2 form a toner image on the thermal expansion sheet and heat the toner image by near infrared irradiation. In particular, the technique in Patent Document 1 forms a CMYK toner image and then heats a black (K) image.

Instead of the CMYK toner image, a CMYK ink image may be formed on the thermal expansion layer using an inkjet printer. Here, if the area of the ink image is large, the amount of moisture with which the thermal expansion sheet is impregnated increases, causing unstable expansion (height) when heating the thermal expansion layer. There is also a problem in that the amount of moisture with which the thermal expansion sheet is impregnated is also dependent on the environment such as humidity.

SUMMARY OF THE INVENTION

A shaping system according to the present invention includes: a printing device that prints an image using predetermined ink on a thermal expansion sheet having a thermal expansion layer on one side; and an expansion device that performs: a drying process of heating the thermal expansion sheet to an extent that allows the thermal expansion layer to maintain a non-expansion state, to dry the image printed by the printing device using the predetermined ink; and an expansion process of, after the drying process, heating the thermal expansion sheet to an extent that allows the thermal expansion layer to expand, to expand the thermal expansion layer.

A shaped object formation method according to the present invention includes: a printing step of printing a first image on a thermal expansion sheet having a thermal expansion layer on one side, using ink; and a drying step of irradiating the thermal expansion sheet with light to heat the thermal expansion sheet to an extent that allows a non-expansion state to be maintained, to dry the ink of the first image.

A computer-readable storage medium according to the present invention stores a program executable by a computer for controlling a shaping system, the program causing the computer to perform: after printing an image on a thermal expansion sheet having a thermal expansion layer on one side, heating the thermal expansion sheet to an extent that allows the thermal expansion layer to maintain a non-expansion state, to dry ink; and after the drying, heating the thermal expansion sheet to an extent that allows expansion, to expand the thermal expansion layer.

A shaping system according to the present invention includes: a printing device that prints an image using predetermined ink on a thermal expansion sheet having a thermal expansion layer on one side; an expansion device that heats the thermal expansion sheet with the image printed thereon by the printing device; and a processor that causes the expansion device to perform: a process of heating the thermal expansion sheet to an extent that allows the thermal expansion layer to maintain a non-expansion state, to dry the image printed by the printing device using the predetermined ink; and a process of heating the thermal expansion sheet to an extent that allows the thermal expansion layer to expand, to expand the thermal expansion layer.

DETAILED DESCRIPTION OF THE INVENTION

Figure 1:
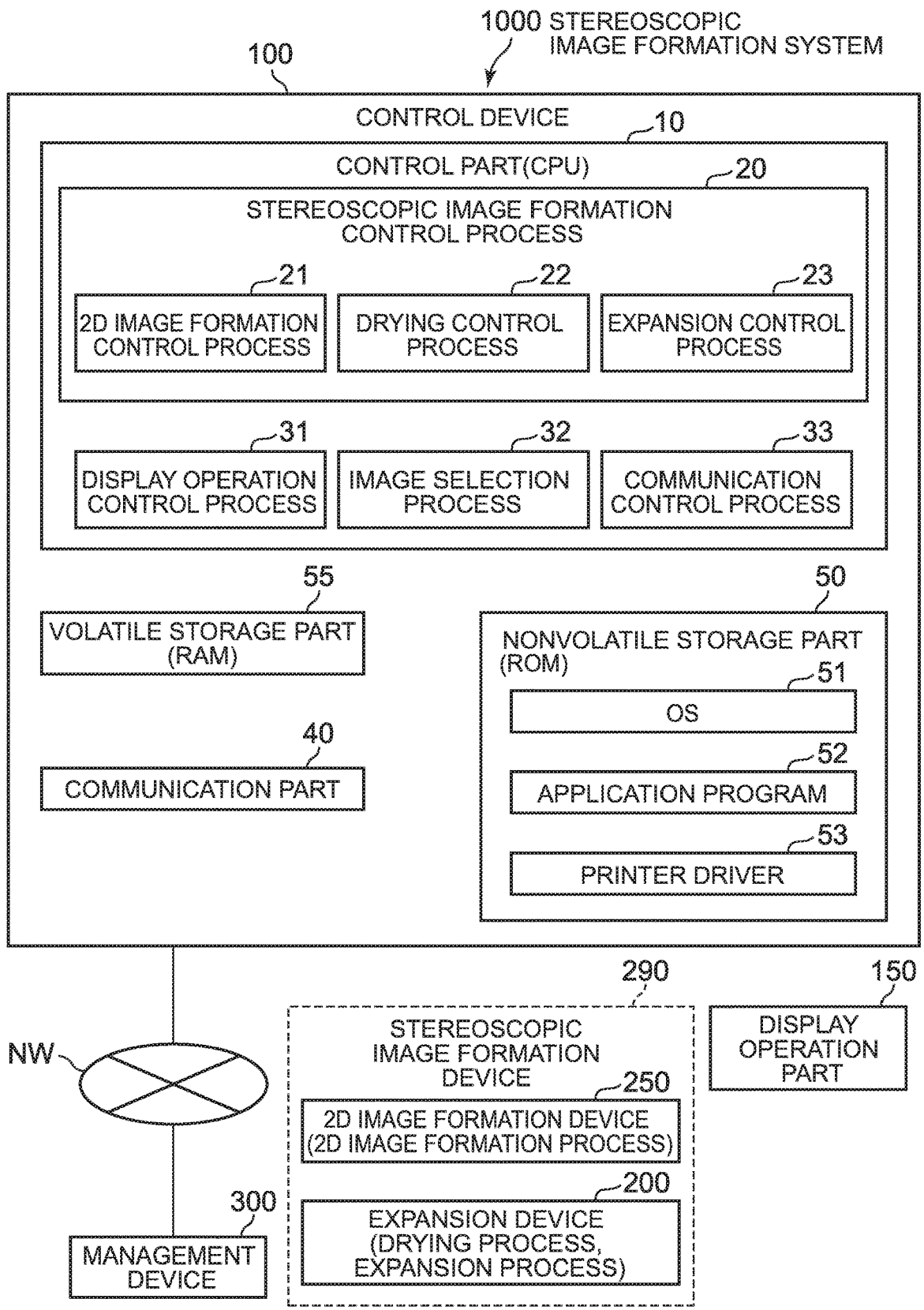
FIG. 1 is a block diagram of a shaping system according to a first embodiment of the present invention.

An embodiment (hereafter referred to as "the present embodiment") of the present invention is described in detail below, with reference to drawings. The drawings merely provide schematic depiction to facilitate the full understanding of the present embodiment. In the drawings, the same or corresponding components are given the same reference signs, and their repeated description is omitted.

In the present embodiment, "stereoscopic image" means a shaped object. The shaped object includes a wide range of shapes in general, such as simple shapes, geometric shapes, and characters. The shaped object also includes decorations formed as a result of decorating. A decoration evokes a sense of beauty through vision and/or touch. The term "stereoscopic image formation" means not only forming a shaped object but also decorating (forming a decoration).

First Embodiment

FIG. 1 is a block diagram of a shaping system according to a first embodiment of the present invention.

The present embodiment relates to a method of forming a stereoscopic image by printing, on a medium (e.g. thermal expansion sheet (thermal foaming sheet/distensible sheet)) having an expansion layer (foaming layer) that expands (distends) according to the amount of absorbed heat on one side, a desired image with black ink including a material (e.g. electromagnetic wave-heat conversion material such as carbon) for converting an electromagnetic wave into heat, and expanding the site of the expansion layer where the image is formed on the medium by irradiation with an electromagnetic wave so as to rise outward.

A shaping system 1000 includes a control device 100, a display operation part 150 connected to the control device, an expansion device 200, and a two-dimensional (2D) image formation device 250 as a 2D image formation process, and is communicably connected to a management device 300 via a network NW. The 2D image formation device 250 and the expansion device 200 constitute a stereoscopic image formation device 290.

The control device 100 is a general-purpose information processing device connected to the display operation part 150, and is a personal computer (PC) that controls the expansion device 200 and the 2D image formation device 250. The display operation part 150 is a touch panel display connected to the control device 100, and includes a display part that displays a 2D image and an input part that receives an input from an operator. The control device 100 includes a control part 10, a communication part 40, a nonvolatile storage part 50, and a volatile storage part 55.

The communication part 40 is a local area network (LAN) interface circuit or universal serial bus (USB) interface circuit that performs communication with the expansion device 200, the 2D image formation device 250, and the management device 300. The management device 300 stores representative stereoscopic image content. The nonvolatile storage part 50 is read only memory (ROM) or a hard disk drive (HDD), and stores an OS 51, an application program 52, a printer driver 53, and the like. The volatile storage part 55 is random access memory (RAM), and is used as working memory.

The 2D image formation device (printing device) 250 is an inkjet printer that performs black printing with black ink (black liquid developer) including carbon to expand (foam) a specific site of a thermal expansion sheet 400 (FIG. 3) as a medium, and performs color printing with color ink (multicolor liquid developer) of CMYK (cyan magenta yellow black) on the whole surface of the thermal expansion sheet 400. Ink is a liquid developer obtained by adding a dye or a pigment to water. The 2D image formation device 250 has a function as a first 2D image formation process of performing color printing on the front side of the thermal expansion sheet 400 with CMYK (cyan magenta yellow black) ink and a function as a second 2D image formation process of performing black printing on the back side with black ink including carbon. The 2D image formation device 250 accordingly needs image data (front side data) of the specific site for partially expanding the thermal expansion layer 410 (FIG. 3) on the front side of the medium, image data (back side data) for partially expanding the expansion layer from the back side of the medium, and color image data. The image data of each of the front side data and the back side data is black developer data for thermally expanding the specific site of the thermal expansion layer 410.

The 2D image formation device 250 performs printing using black ink, based on the front side data indicating the portion to foam and expand on the front side of the thermal expansion sheet 400. The 2D image formation device 250 equally performs printing using black ink, based on the back side data indicating the portion to foam and expand on the back side of the thermal expansion sheet 400. Black ink including carbon black is an example of a material for converting electromagnetic wave light into heat. The material for converting an electromagnetic wave into heat may be another material. A portion where the density of black ink is higher has a greater expansion height of the thermal expansion layer. Hence, the density (gradation) of black ink is determined so as to correspond to a target height.

The expansion device 200 expands the thermal expansion sheet 400 by heating.

The expansion device 200 has a function as an expansion process of thermally expanding, by radiant heat, the front side or both the front and back sides of the thermal expansion sheet 400 on which a black image is two-dimensionally formed, and a function as a drying process of drying, by radiant heat, the thermal expansion sheet 400 with ink applied thereon. Thus, the function as the expansion process and the function as the drying process are realized by the same entity which is the expansion device 200.

The control part 10 is a central processing unit (CPU), and executes a program to realize functions as a stereoscopic image formation control process 20, a display operation control process 31, an image selection process 32, and a communication control process 33. The stereoscopic image formation control process 20 includes a 2D image formation control process 21, a drying control process 22, and an expansion control process 23. The CPU 11 includes a computing unit such as a processor.

The display operation control process 31 causes the display operation part 150 to display a predetermined screen, and receives a touch operation by the operator. The image selection process 32 has a function of, for example, displaying a plurality of pieces of content (sample images) of stereoscopic images on the thermal expansion sheet 400 (FIG. 3) through the display operation control process 31, and prompting the user to select one of the plurality of pieces of content. The communication control process 33 is a functional part that controls the communication part 40.

The 2D image formation control process 21 is a functional part that controls the 2D image formation device 250 via the printer driver 53. The 2D image formation control process 21 has a function of forming a CMYK color image using ink (liquid developer) on the front side of the thermal expansion sheet 400, and a function of forming a black image using black ink (black developer) including carbon on at least one of the front and back sides of the thermal expansion sheet 400.

The drying control process 22 is a functional part that causes the expansion device 200 to function as the drying process. The drying control process 22 dries the thermal expansion sheet 400 on which a 2D image is formed using ink (liquid developer) of CMY or black ink (black developer), by radiant heat emitted from a halogen lamp 215 (FIG. 2) of the expansion device 200. In particular, in the case where the 2D image is formed using black (K) ink (black developer) on the front side of the thermal expansion sheet 400, the drying control process 22 irradiates the thermal expansion sheet 400 with the near infrared light of the halogen lamp 215 from the back side of the thermal expansion sheet 400, for drying. This prevents the expansion device 200 from heating the portion (black developer image) printed with black ink on the front side, so that a thermal expansion layer 410 (FIG. 3) is kept from thermally expanding. Even in the case where the 2D image is formed using black (K) ink (black developer) on the front side of the thermal expansion sheet 400, the thermal expansion sheet 400 may be irradiated with the near infrared light of the halogen lamp 215 from the front side thereof. In this case, such heat that does not cause the thermal expansion sheet 400 to expand is applied for drying. For example, by increasing the conveyance speed of the thermal expansion sheet 400 or by decreasing the light intensity of the lamp, the thermal expansion sheet 400 can be kept (prevented) from expanding even when the near infrared light of the halogen lamp 215 is applied to the front side of the expansion sheet 400.

The drying control process 22 causes the display operation part 150 to display "dry the back side of the thermal expansion sheet 400" or "place the thermal expansion sheet 400 with the back side up in the paper feed part 220 of the expansion device 200", before causing the expansion device 200 to light the halogen lamp 215.

The expansion control process 23 is a functional part that causes the expansion device 200 to function as the expansion process. The expansion control process 23 irradiates the thermal expansion sheet 400 with the halogen lamp 215 from the front side of the thermal expansion sheet 400, in the case where a black developer image (K) is two-dimensionally formed on the front side of the thermal expansion sheet 400. The expansion device 200 thus expands the portion of the thermal expansion layer 410 where the black (K) 2D image is formed, to form a 2.5D stereoscopic image with steeply changing irregularities. The 2.5D stereoscopic image means a stereoscopic structure obtained by forming irregularities in the thickness direction on a plane. In the case where the black developer image is two-dimensionally formed on the back side of the thermal expansion sheet 400, the thermal expansion sheet 400 is irradiated with the light of the halogen lamp 215 from the back side. In this way, the expansion device 200 causes the heat generation of the portion of the base material 415 where the 2D image is formed with the black developer, and causes the gradual thermal expansion of the thermal expansion layer 410 generating heat by thermal conduction, to form a 2.5D stereoscopic image with gently changing irregularities on the front side.

The expansion control process 23 causes the display operation part 150 to display "expand the back side of the thermal expansion sheet 400" and "place the thermal expansion sheet 400 with the back side up in the paper feed part 220 of the expansion device 200", before causing the expansion device 200 to light the halogen lamp 215.

The front side of the thermal expansion sheet 400 may be printed with black and then expanded. In such a case, the expansion control process 23 causes the display operation part 150 to display "expand the front side of the thermal expansion sheet 400" and "place the thermal expansion sheet 400 with the front side up in the paper feed part 220 of the expansion device 200", before causing the expansion device 200 to light the halogen lamp 215.

Figure 2:
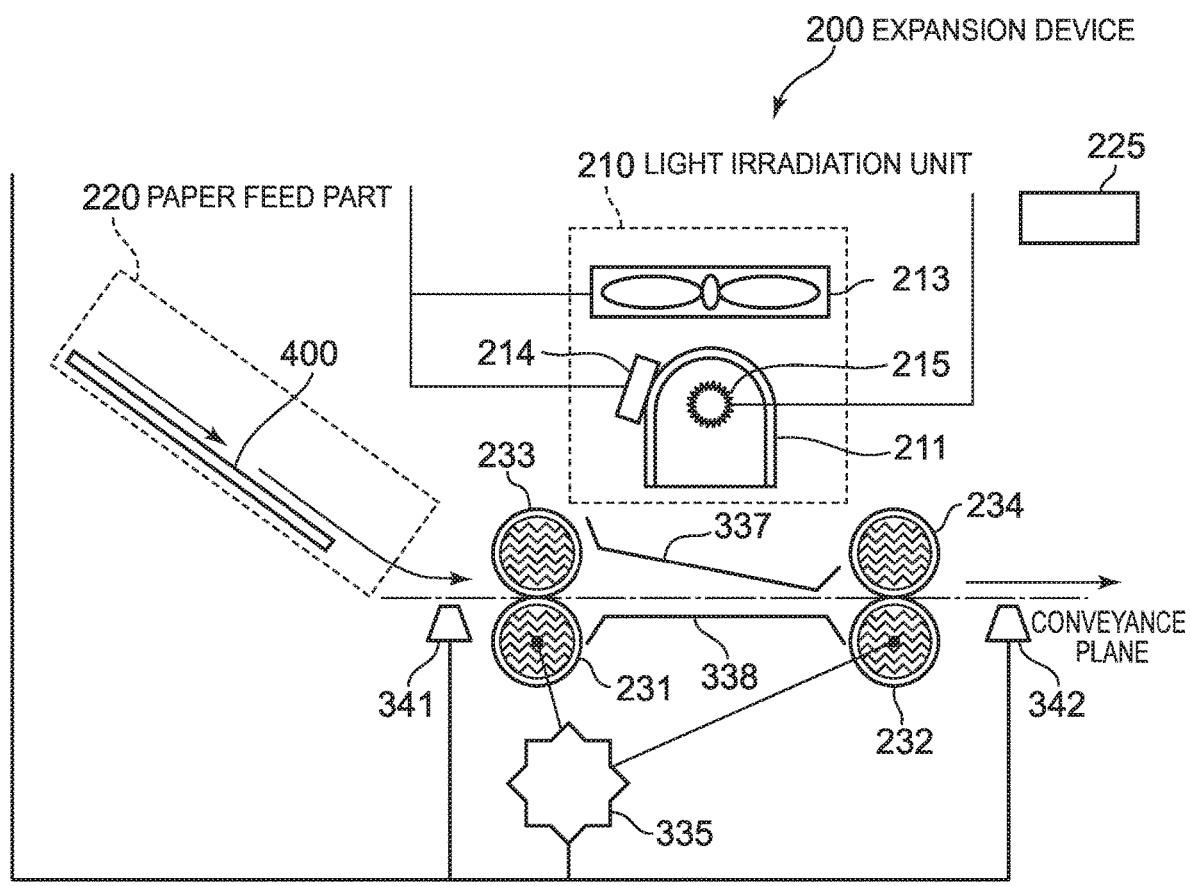
FIG. 2 is a block diagram of an expansion device.

FIG. 2 is a block diagram of the expansion device.

The expansion device 200 includes the paper feed part 220, drive rollers 231 and 232, driven rollers 233 and 234, a light irradiation unit 210, a motor 335, an upper guide 337, a lower guide 338, a room temperature sensor 225, an entrance sensor 341, and an exit sensor 342. The paper feed part 220 feeds the thermal expansion sheet 400 to the conveyance path. The drive rollers 231 and 232, the driven rollers 233 and 234, the motor 335, the upper guide 337, and the lower guide 338 constitute a conveyance unit (conveyance part).

The light irradiation unit 210 includes a reflector 211, the halogen lamp 215, a cooling fan 213, and a temperature sensor 214. The halogen lamp 215 is a linear light source emitting near infrared light and visible light from its outer peripheral surface. The reflector 211 is a parabolic reflector made of aluminum, and collimates the radiation light of the halogen lamp 215. The halogen lamp 215 and the reflector 211 are located above the conveyance plane, so that light in the near infrared region and the visible light region (electromagnetic wave) is applied from above the thermal expansion sheet 400. When the thermal expansion sheet 400 printed with black ink including carbon black is irradiated with light, the light is converted into heat more efficiently in the portion printed with black ink than the portion not printed with black ink. Accordingly, the region printed with black ink in the thermal expansion layer 410 is mainly heated, and as a result the thermal expansion layer 410 expands in the region printed with black ink. The cooling fan 213 air-cools the reflector 211. The temperature sensor 214 is attached to the back of the reflector 211, and detects the temperature of the back of the reflector 211.

The drive rollers 231 and 232 and the driven rollers 233 and 234 convey the thermal expansion sheet 400 being conveyed, by sandwiching it from above and below. The drive rollers 231 and 232 are driven by the motor 335. The upper guide 337 and the lower guide 338 are formed like a grid, and guide the thermal expansion sheet 400 from above and below the conveyance plane. The upper guide 337 is inclined so as not to cast a dark shadow over the thermal expansion sheet 400. Since the upper guide 337 and the thermal expansion sheet 400 are away from each other by a predetermined distance directly below the halogen lamp 215, no dark shadow is cast over the thermal expansion sheet 400.

The paper feed part 220 has the thermal expansion sheet 400 placed therein, and feeds the placed thermal expansion sheet 400 to the conveyance unit. The room temperature sensor 225 is a sensor for detecting the room temperature. The entrance sensor 341 and the exit sensor 342 detect the front end and back end of the thermal expansion sheet 400 being conveyed.

Figure 3:
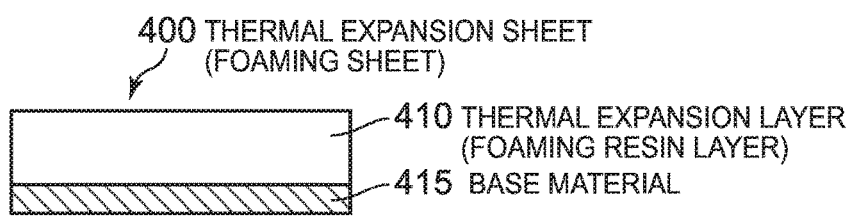
FIG. 3 is a sectional diagram of a thermal expansion sheet.

FIG. 3 is a sectional diagram of the thermal expansion sheet (foaming sheet).

The thermal expansion sheet 400 is a sheet-like medium obtained by stacking the base material 415 and the thermal expansion layer 410. In detail, the thermal expansion sheet 400 has the thermal expansion layer 410 on one side (front side), and the base material 415 on the other side (back side). The base material 415 is an elastically deformable paper sheet. The thermal expansion layer 410 is an expansion resin layer that expands (foams) by heat. Irregularities are formed on the front side of the thermal expansion sheet 400, by the 2D image formation device (printing device) 250 performing printing to cause the thermal expansion layer 410 of the thermal expansion sheet 400 to expand and rise outward. Such raised parts (bumps) of the thermal expansion layer 410 form projections, or projections and depressions. Thus, a stereoscopic image (stereoscopic object or shaped object) is formed on the thermal expansion sheet 400.

The thermal expansion layer 410 is formed on one side (upper side in FIG. 3) of the base material 415. The thermal expansion layer 410 is a layer that expands to such an extent that corresponds to the heating temperature and the heating time, and has a plurality of pieces of thermal expansion material (thermally expandable microcapsule, micropowder) dispersed in a binder. In the present embodiment, an electromagnetic wave-heat conversion layer (hereafter simply referred to as "conversion layer") 420 in FIG. 4 for converting an electromagnetic wave into heat is formed on the upper side (front side) of the base material 415 and/or the lower side (back side) of the base material 415 and irradiated with light, to cause heat generation in the region provided with the conversion layer 420. The electromagnetic wave-heat conversion layer is heated when irradiated with an electromagnetic wave. The thermal expansion layer 410 absorbs the heat generated by the conversion layer provided on the front side and/or back side of the thermal expansion sheet 400, to foam and expand. This enables selective expansion of only a specific region of the thermal expansion sheet 400. For example, the thermal expansion material foams and expands when heated to a temperature of about 80° C. to 120° C.

FIGS. 4A to 4D are sectional diagrams illustrating 2D image formation and thermal expansion for the thermal expansion sheet.

Figure 4A:
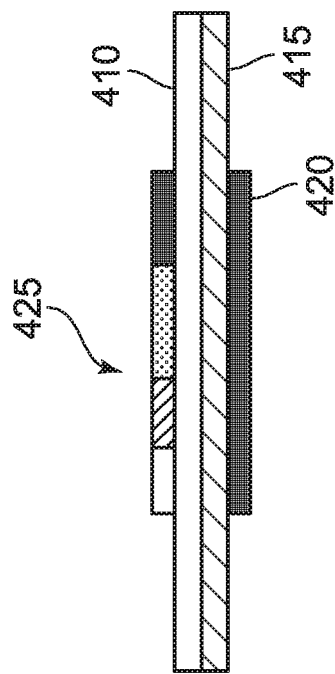
FIGS. 4A to 4D are sectional diagrams illustrating 2D image formation and thermal expansion for the thermal expansion sheet.
Figure 4B:
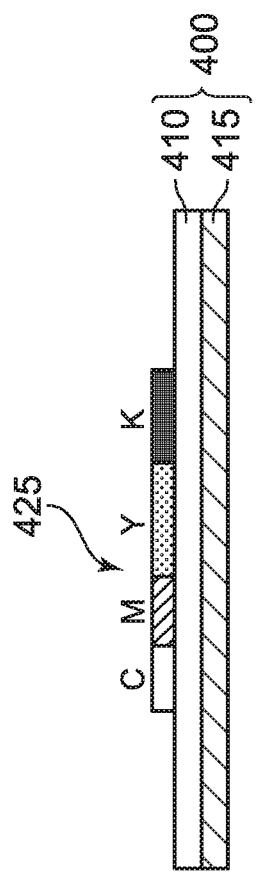

FIG. 4A is a sectional diagram of the state where the 2D image formation device 250 (FIG. 1) two-dimensionally forms a color image layer 425 using CMYK color ink (multicolor liquid developer) on the front side of the thermal expansion sheet 400, i.e. on the thermal expansion layer 410. FIG. 4B is a sectional diagram when the back side of the thermal expansion sheet 400, i.e. the base material 415, is irradiated with near infrared light from the halogen lamp 215 (FIG. 2) of the expansion device 200, to dry the color ink by radiant heat. The drying is performed with such temperature that does not cause the thermal expansion layer 410 to expand (foam) or such conveyance speed that does not cause the thermal expansion layer 410 to expand (foam). By adjusting the temperature or the conveyance speed in this way, the non-expansion state of the thermal expansion layer 410 is maintained. Here, no 2D image with color ink (especially black ink) is formed on the back side of the thermal expansion sheet 400.

Figure 4C:
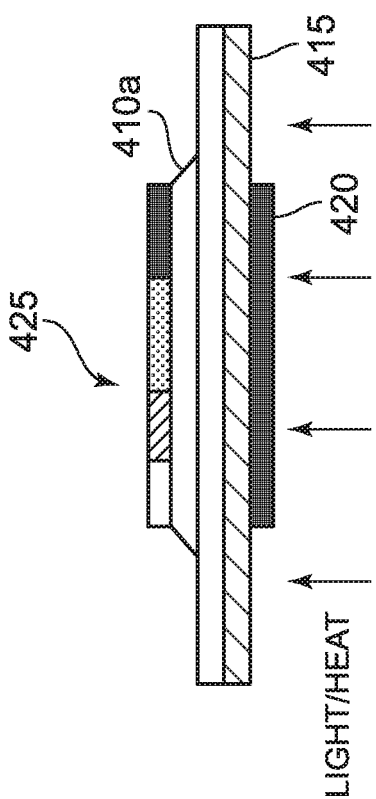
Figure 4D:
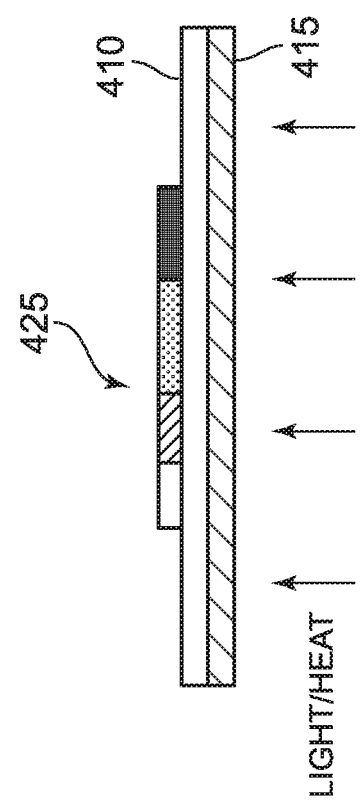

FIG. 4C is a sectional diagram when the 2D image formation device 250 two-dimensionally forms the conversion layer 420 using black ink on the back side of the thermal expansion sheet 400, i.e. on the base material 415. FIG. 4D is a sectional diagram of the state where the back side of the thermal expansion sheet 400 is irradiated with near infrared light from the halogen lamp 215 to form a thermal expansion layer 410a thermally expanding (foaming) by radiant heat.

In particular, the drying of the color ink (CMYK) in FIG. 4B has an advantageous effect of reducing the amount of moisture with which the thermal expansion sheet 400 is impregnated and stabilizing the expansion (expansion height) when the thermal expansion layer 410 thermally expands, even in the case where the area of the color image is large. Since the amount of moisture which depends on humidity and the like is reduced, the expansion is stable despite environmental changes.

In FIG. 4D, the halogen lamp 215 generates intense near infrared light, thus intensely heating the conversion layer 420 including carbon. Hence, only the site of the thermal expansion layer 410 subjected to thermal conduction from the conversion layer 420 thermally expands, resulting in 2.5D printing. On the other hand, the color image layer 425 of CMYK is two-dimensionally formed on the front side of the thermal expansion sheet 400. Since the base material 415 blocks the near infrared light of the halogen lamp 215, the color image layer 425 of black (K) is not heated. Here, the conversion layer 420 on the back side is black ink of a single color, which is lower in ink content and affects the drying degree less than the color ink on the front side. The color image layer 425 of CMY does not generate much heat because it does not include carbon, even when the thermal expansion sheet 400 is irradiated with near infrared light from the front side.

Figure 5:
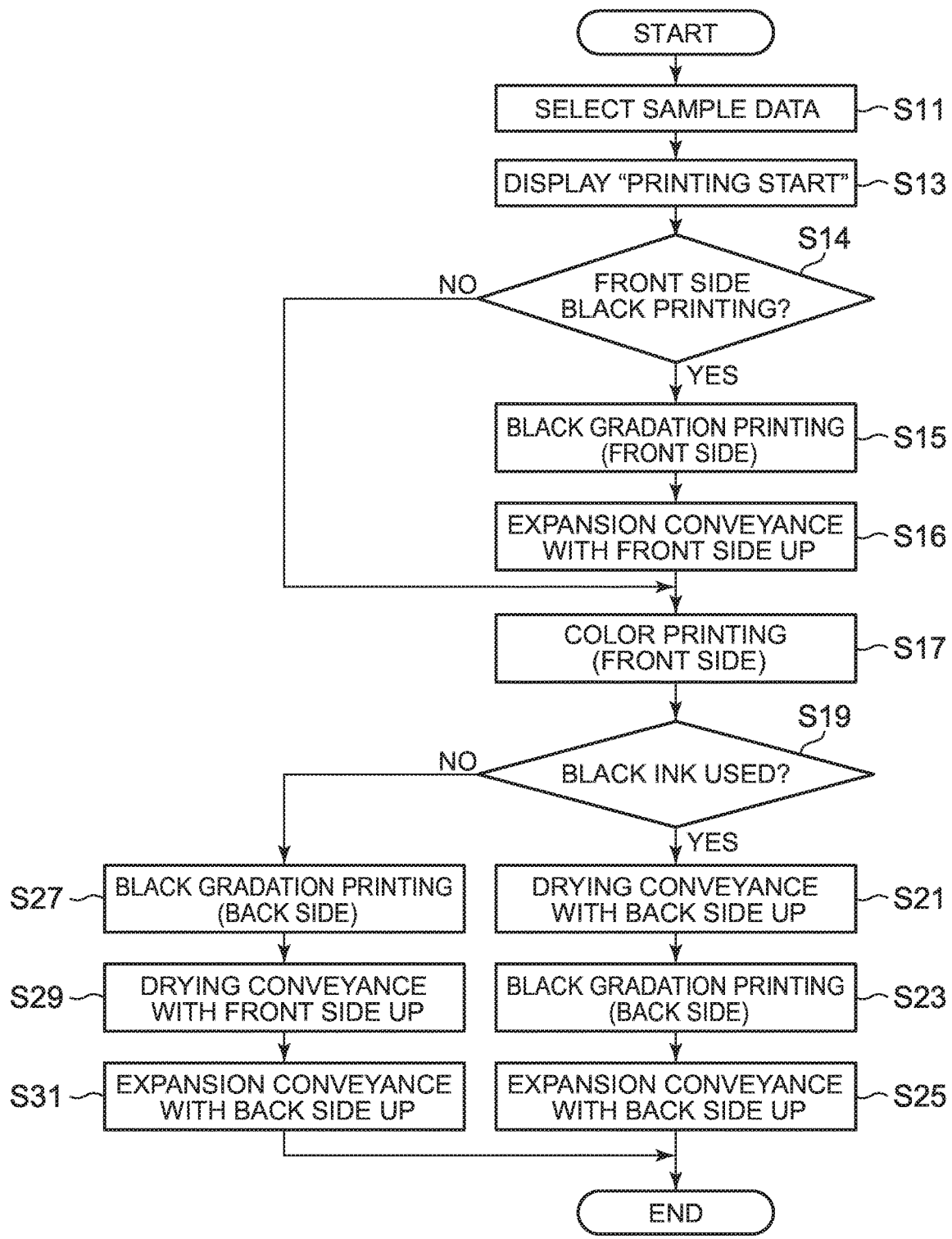
FIG. 5 is a flowchart illustrating the operation of a 2D image formation system according to the present embodiment.

FIG. 5 is a flowchart illustrating the operation of the 2D image formation system according to the present embodiment.

This routine starts upon power on or reset. First, the image selection process 32 displays a content list display screen listing a plurality of pieces of content (image samples) produced beforehand on the display operation part 150, and receives the selection of content (sample data) by the operator (S11).

Figure 6:
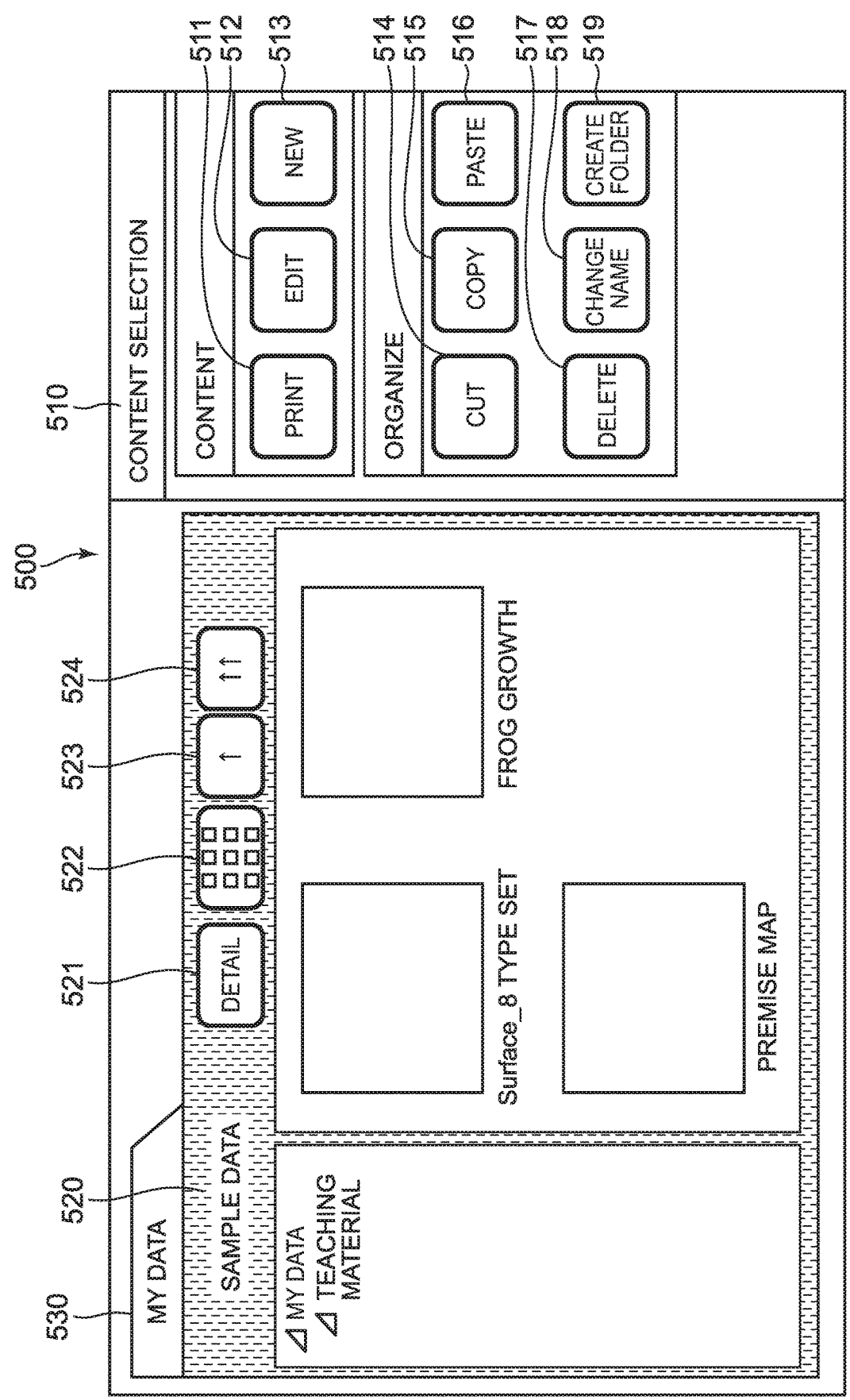
FIG. 6 is a diagram illustrating an example of a content list display screen listing sample images.

FIG. 6 is a diagram illustrating an example of the content list display screen listing sample images.

A content list display screen 500 includes an operation panel 510 and a list display panel 520. The operation panel 510 includes a "print" button 511, an "edit" button 512, a "new" button 513, a "cut" button 514, a "copy" button 515, a "paste" button 516, a "delete" button 517, a "change name" button 518, and a "create folder" button 519.

The "print" button 511 is a button for printing the content selected on the list display. The "edit" button 512 is a button for starting a mode of editing the content selected on the list display. The "new" button 513 is a button for newly creating content. The "cut" button 514 is a button for cutting the content selected on the list display. The "copy" button 515 is a button for copying the content selected on the list display. The "paste" button 516 is a button for pasting any cut or copied content to the current folder. The "delete" button 517 is a button for deleting the content selected on the list display or a folder. The "change name" button 518 is a button for displaying an input dialog and changing the name of content or a folder. The "create folder" button 519 is a button for displaying a folder name input dialog and creating a subfolder with an input name.

The list display panel 520 is a panel for displaying a plurality of pieces of content (sample images), and includes a "my data" tab 530, a "detail" button 521, a "small icon" button 522, a "move up" button 523, and a "move to top" button 524. The list display panel 520 displays, for example, images of sample data such as "Surface_8 type set", "frog growth", "premise map", as the plurality of pieces of content.

The "my data" tab 530 is a tab for displaying my data stored in the nonvolatile storage part 50 (FIG. 1), and is selectively displayed with a "cloud" tab (not illustrated) for displaying cloud data. The "detail" button 521 is a button for displaying the selected content in detail. In the case where no content is selected, the first content in the current folder is displayed. When any folder is selected, the detail screen is not displayed. The "small icon" button 522 is a button for displaying folder icon/content images in small size on the list display. The "move up" button 523 is a button for moving to a folder immediately above. The "move to top" button 524 is a button for moving to a ROOT folder.

Returning to FIG. 5, when content is selected in S11, the stereoscopic image formation control process 20 causes the display operation part 150 to perform "printing start" display (S13).

Figure 7:
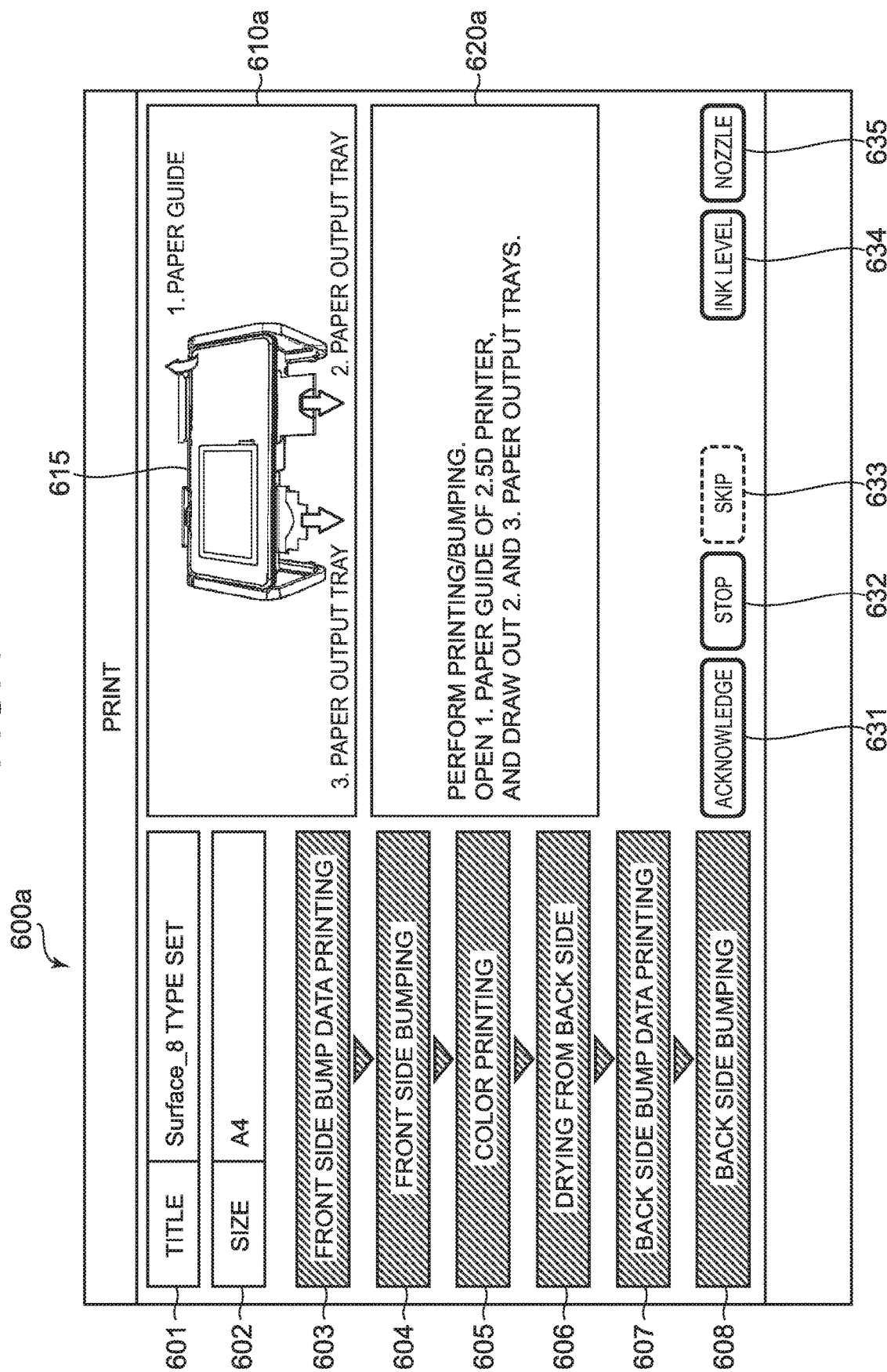
FIG. 7 is a diagram illustrating an example of a printing start display screen.

FIG. 7 is a diagram illustrating an example of a printing start display screen.

A print panel 600a includes a guidance image 610 (610a), a guidance description image 620 (620a), a "title" display field 601, a "size" display field 602, a multiple operation display, an "acknowledge" button 631, a "stop" button 632, a "skip" button 633, an "ink level" button 634, and a "nozzle" button 635.

The guidance image 610a displays a shaping system image 615 as the image of the main body, and particularly displays character strings "1. paper guide", "2. paper output tray", and "3. paper output tray." The guidance description image 620a displays a guidance in text, and provides the description of printing preparation by a character string "Perform printing/bumping. Open 1. paper guide of 2.5D printer, and draw out 2. and 3. paper output trays."

The multiple operation display includes a "front side bump data printing" operation display 603, a "front side bumping" operation display 604, a "color printing" operation display 605, a "drying from back side" operation display 606, a "back side bump data printing" operation display 607, and a "back side bumping" operation display 608, and indicates the printing/bumping procedure.

The "acknowledge" button 631 is a button pressed by the operator when acknowledging the operation indicated by the guidance image 610 and the guidance description image 620. The "stop" button 632 is a button for stopping printing/bumping and returning to the previous screen. The "skip" button 633 is a button for stopping the current operation and proceeding to the next operation. The "skip" button 633 is usually not used during printing/bumping, and so is shown by a dashed line. The "ink level" button 634 is a button for starting a standard dialog of the manufacturer for displaying the ink level. The "nozzle" button 635 is a button for starting a standard dialog of the manufacturer for head cleaning and nozzle check.

Returning to FIG. 5, when the "acknowledge" button 631 is pressed in S13, the stereoscopic image formation control process 20 determines whether or not the content (sample data) selected in S11 is subjected to front side black printing (S14). In the case where the content is subjected to black printing (S14: "YES"), the stereoscopic image formation control process 20 advances to S15. In the case where the content is not subjected to black printing (S14: "NO"), the stereoscopic image formation control process 20 advances to S17.

In the case where the content is subjected to black printing (S14: "YES"), the 2D image formation control process 21 (FIG. 1) instructs the 2D image formation device 250 (FIG. 1) to form the conversion layer 420 (perform black gradation printing) using black ink on the front side of the thermal expansion sheet 400 (the thermal expansion layer 410 side) (S15). In detail, the 2D image formation control process 21 causes the display operation part 150 to display a print panel 600b (FIG. 8), and the 2D image formation device 250 to perform printing (front side bump data printing) using black ink.

Figure 8:
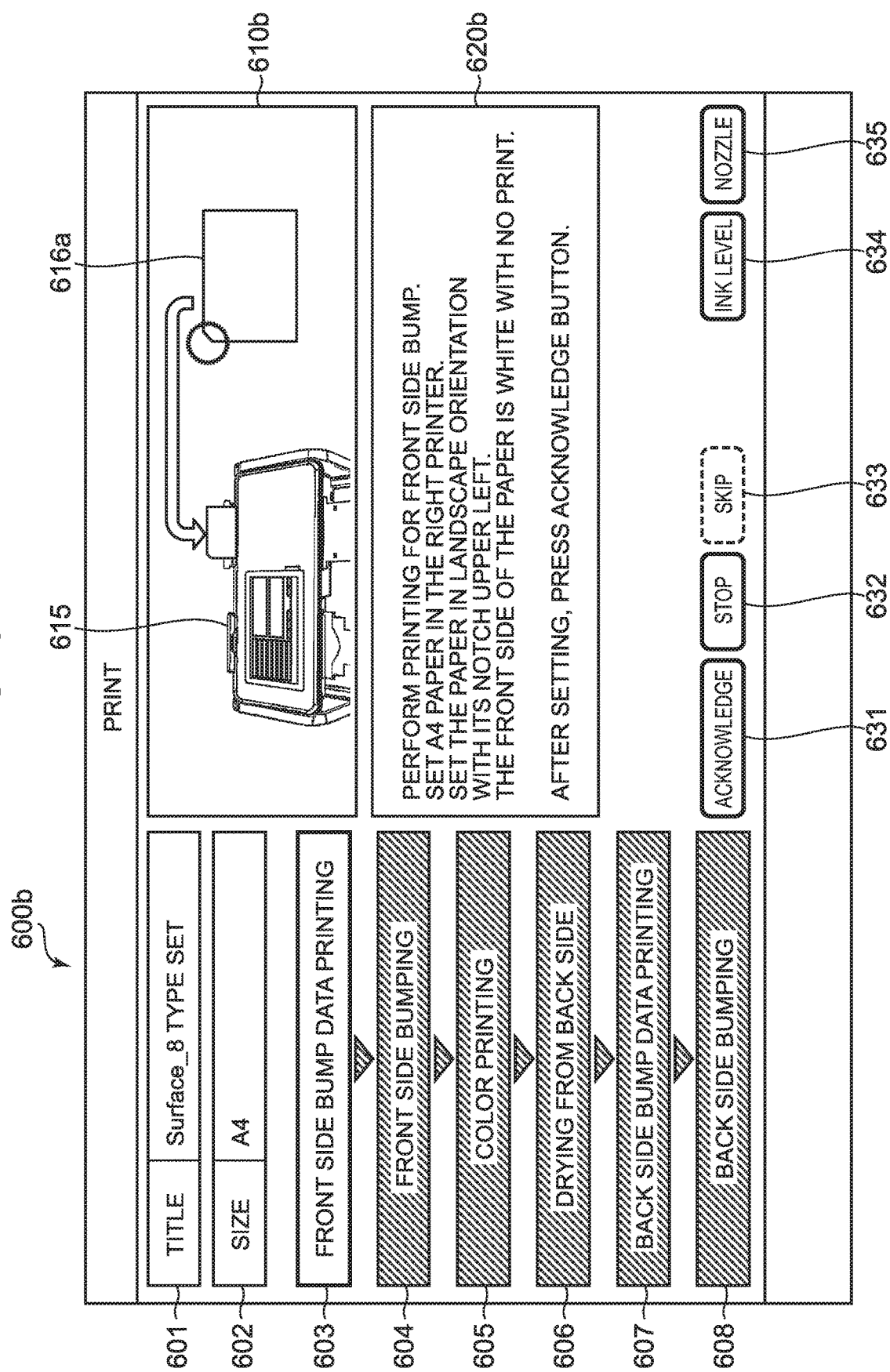
FIG. 8 is a diagram illustrating an example of the screen of a print panel in "front side bump data printing" operation.

FIG. 8 is a diagram illustrating an example of the screen of the print panel in the "front side bump data printing" operation.

The print panel 600b differs from the print panel 600a (FIG. 7) in that the "front side bump data printing" operation display 603 is not hatched and shown by a solid line and the guidance image 610a and the guidance description image 620a are changed respectively to a guidance image 610b and a guidance description image 620b. Here, the solid line and non-hatching of the "front side bump data printing" operation display 603 indicate that the "front side bump data printing" operation is being executed.

The guidance image 610b includes the shaping system image 615, a thermal expansion sheet image 616a on the right, and an arrow image indicating to insert the thermal expansion sheet 400 in 1. paper guide (FIG. 7).

The guidance description image 620b includes a character string "Perform printing for front side bump. Set A4 paper in the right printer. Set the paper in landscape orientation with its notch upper left. The front side of the paper is white with no print. After setting, press acknowledge button." Here, "printer" means the 2D image formation device 250 (FIG. 1). When the "acknowledge" button 631 is pressed, the 2D image formation device 250 performs black printing in predetermined density.

The character string "Perform printing for front side bump." indicates to perform 2D image formation with the black developer (K), and the character string "Set the paper with its notch upper left. The front side of the paper is white with no print." indicates to form an image on one side (the thermal expansion layer 410 side) of the thermal expansion sheet 400.

Returning to FIG. 5, after S15, the expansion control process 23 (FIG. 1) instructs the expansion device 200 to expand (bump) the thermal expansion sheet 400 with its front side up (S16). In detail, the 2D image formation control process 21 causes the display operation part 150 to display a print panel 600c (FIG. 9), and the expansion device 200 to expand (bump) the front side. Here, no 2D image with the black developer is formed on the back side of the thermal expansion sheet 400.

Figure 9:
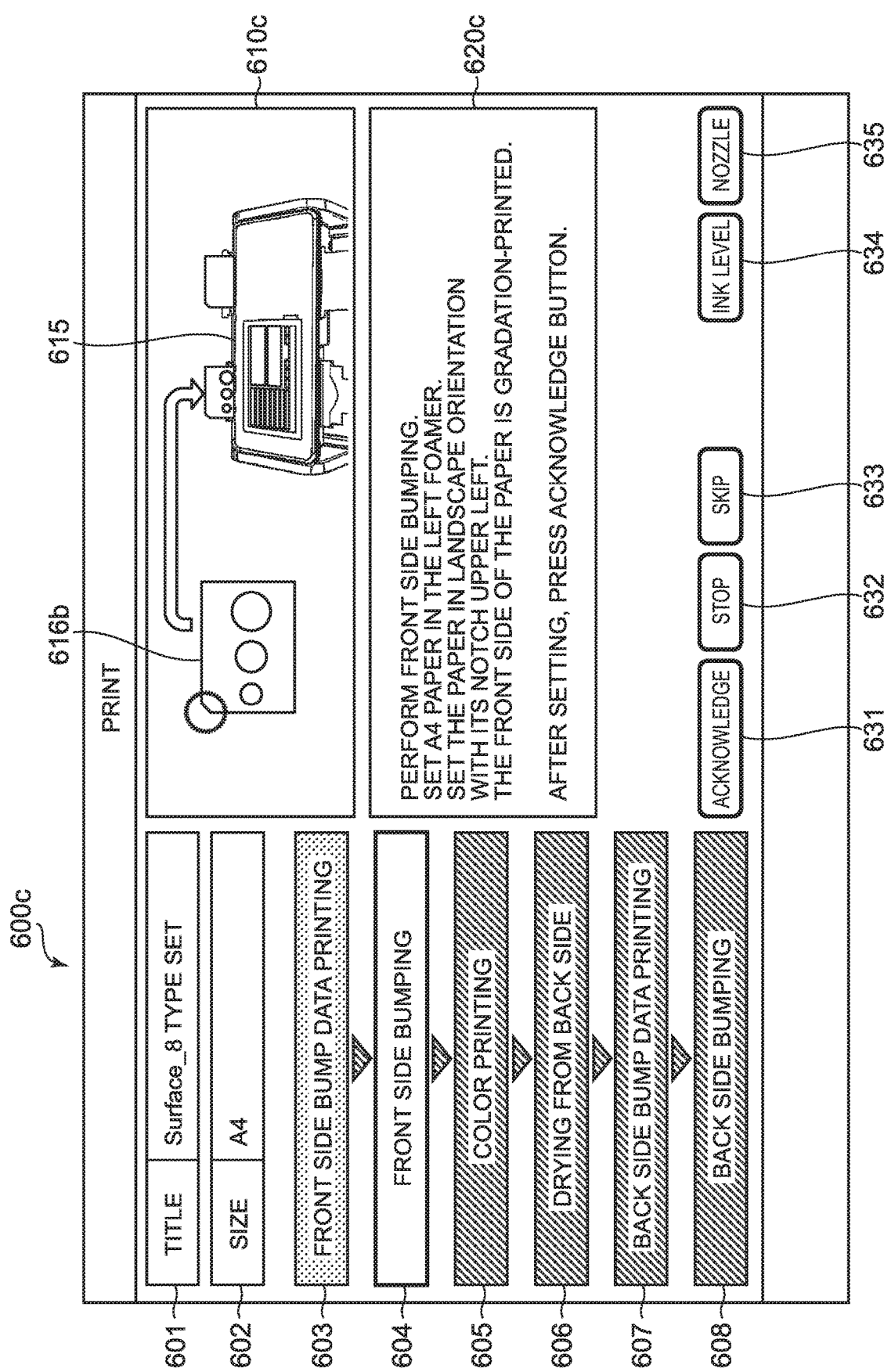
FIG. 9 is a diagram illustrating an example of the screen of the print panel in "front side bumping" operation.

FIG. 9 is a diagram illustrating an example of the screen of the print panel in the "front side bumping" operation. The print panel 600c differs from the print panel 600b (FIG. 8) in that the "front side bump data printing" operation display 603 is hatched, the "front side bumping" operation display 604 is not hatched, and the guidance image 610b and the guidance description image 620b are changed respectively to a guidance image 610c and a guidance description image 620c.

The hatching of the "front side bump data printing" operation display 603 indicates the end of the bump data printing operation. The white background display of the "front side bumping" operation display 604 indicates that the "front side bumping" is being executed. The guidance image 610c includes the shaping system image 615, a thermal expansion sheet image 616b one the left, and an arrow image indicating to place the thermal expansion sheet 400 in the paper feed part 220 (FIG. 2) of the expansion device 200. The thermal expansion sheet image 616b is an image obtained by printing a black gradation image (e.g. an image of three circles with different diameters) on the front side of the thermal expansion sheet. The guidance description image 620c includes a character string "Perform front side bumping. Set A4 paper in the left foamer. Set the paper in landscape orientation with its notch upper left. The front side of the paper is gradation-printed. After setting, press acknowledge button."

The character string "Perform front side bumping." indicates to expand the front side of the thermal expansion sheet 400, and the character string "Set the paper in landscape orientation with its notch upper left." indicates to apply near infrared light to one side (the thermal expansion layer 410 side) of the thermal expansion sheet 400.

Figure 14:
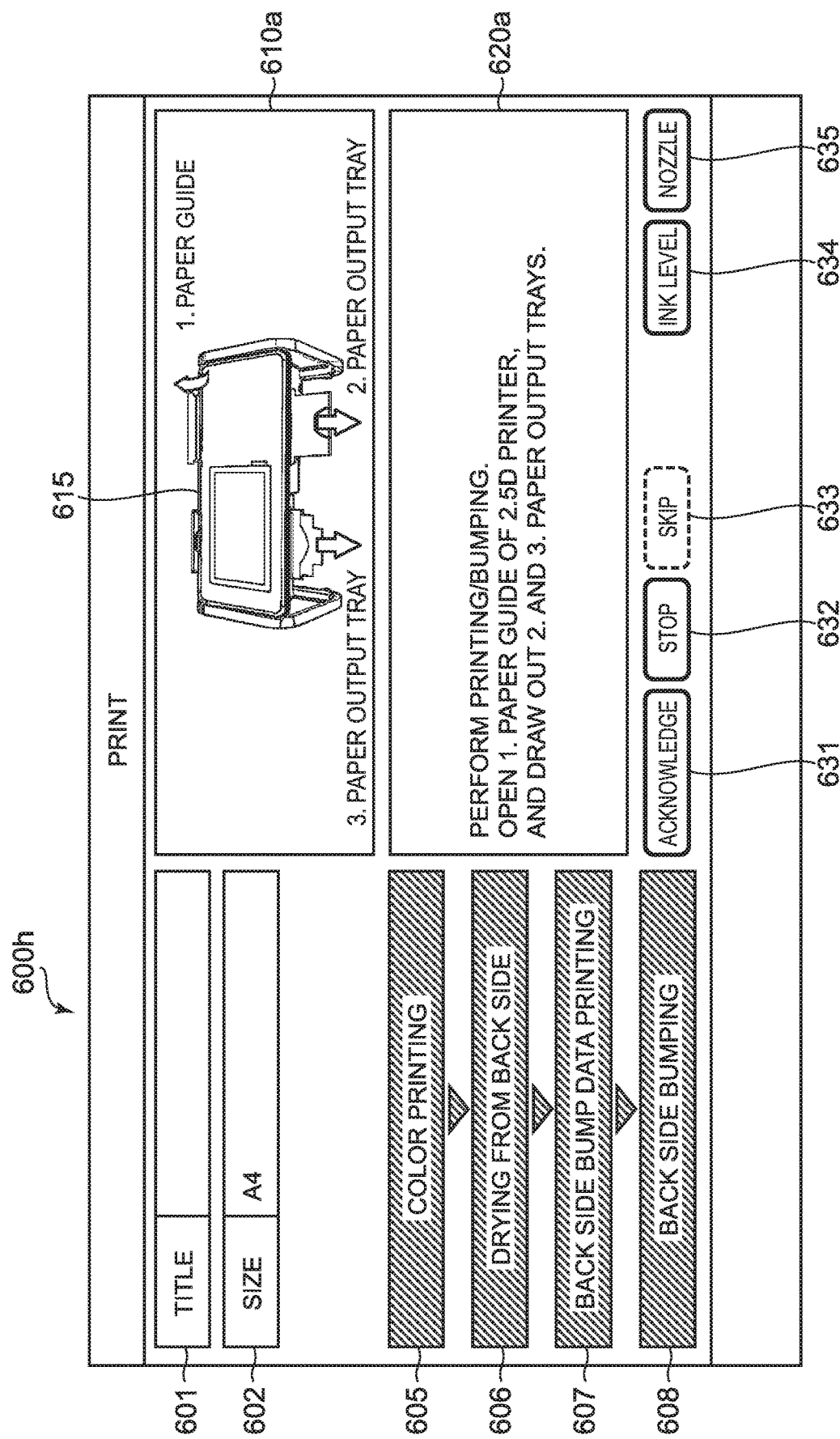
FIG. 14 is a diagram illustrating another example of the screen of the print panel in "front side color printing" operation.

Returning to FIG. 5, after S16 or in the case of determining that the content is not subjected to black printing in S14 (S14: "NO"), the 2D image formation control process 21 (FIG. 1) instructs the 2D image formation device 250 to perform color printing on the front side of the thermal expansion sheet 400 (S17). In detail, the 2D image formation control process 21 causes the display operation part 150 to display a print panel 600d (FIG. 10), and the 2D image formation device 250 (FIG. 1) to perform 2D image formation using color ink. The 2D image formation control process 21 may cause the display operation part 150 to display a print panel 600h in FIG. 14, instead of the print panel 600d in FIG. 10.

Figure 10:
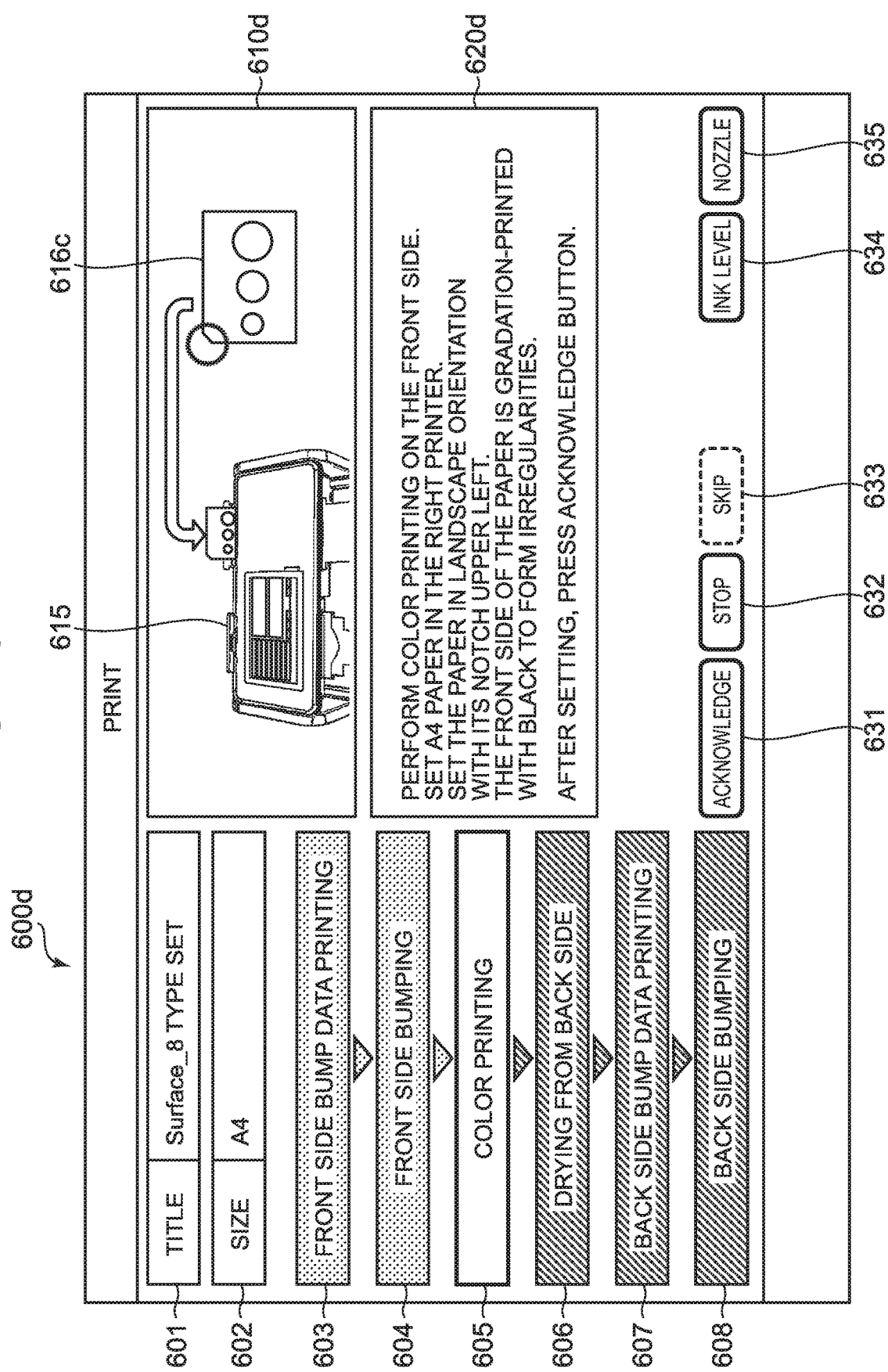
FIG. 10 is a diagram illustrating an example of the screen of the print panel in "front side color printing" operation.

FIG. 10 is a diagram illustrating an example of the screen of the print panel in the "front side color printing" operation.

The print panel 600d differs from the print panel 600c (FIG. 9) in that the "front side bumping" operation display 604 is hatched, the "color printing" operation display 605 is not hatched and displayed in white background, and the guidance image 610c and the guidance description image 620c are changed respectively to a guidance image 610d and a guidance description image 620d.

The non-hatching of the "color printing" operation display 605 indicates that the "color printing" operation is being executed. The guidance image 610c differs from the guidance image 610b (FIG. 8) in that a thermal expansion sheet image 616c is an image printed with black. The guidance description image 620d includes a character string "Perform color printing on the front side. Set A4 paper in the right printer. Set the paper in landscape orientation with its notch upper left. The front side of the paper is gradation-printed with black to form irregularities. After setting, press acknowledge button." The 2D image formation control process 21 thus indicates to perform 2D image formation with the multicolor developer (CMYK) and to form an image on the thermal expansion layer 410 side of the thermal expansion sheet 400. When the "acknowledge" button 631 is pressed, the 2D image formation device 250 performs color printing on the front side of the thermal expansion sheet 400.

Returning to FIG. 5, after the color printing in S17, the stereoscopic image formation control process 20 determines whether or not black ink (K) is used (black ink is included) in the color printing operation in S17 (S19). In the case where black ink (K) is used (black ink is included) in the color printing in S17 (S19: "YES"), the drying control process 22 (FIG. 1) performs drying conveyance (heating conveyance) with the back side of the thermal expansion sheet 400 up (S21). Here, the drying control process 22 causes the display operation part 150 to display a print panel 600e (FIG. 11), and the 2D image formation device 250 (FIG. 1) to perform "drying from back side" operation. In detail, the 2D image formation device 250 dries the ink applied in the color printing (S17), from the back side. Here, the black ink (K) on the front side does not absorb radiant heat because the base material 415 blocks near infrared light.

Figure 11:
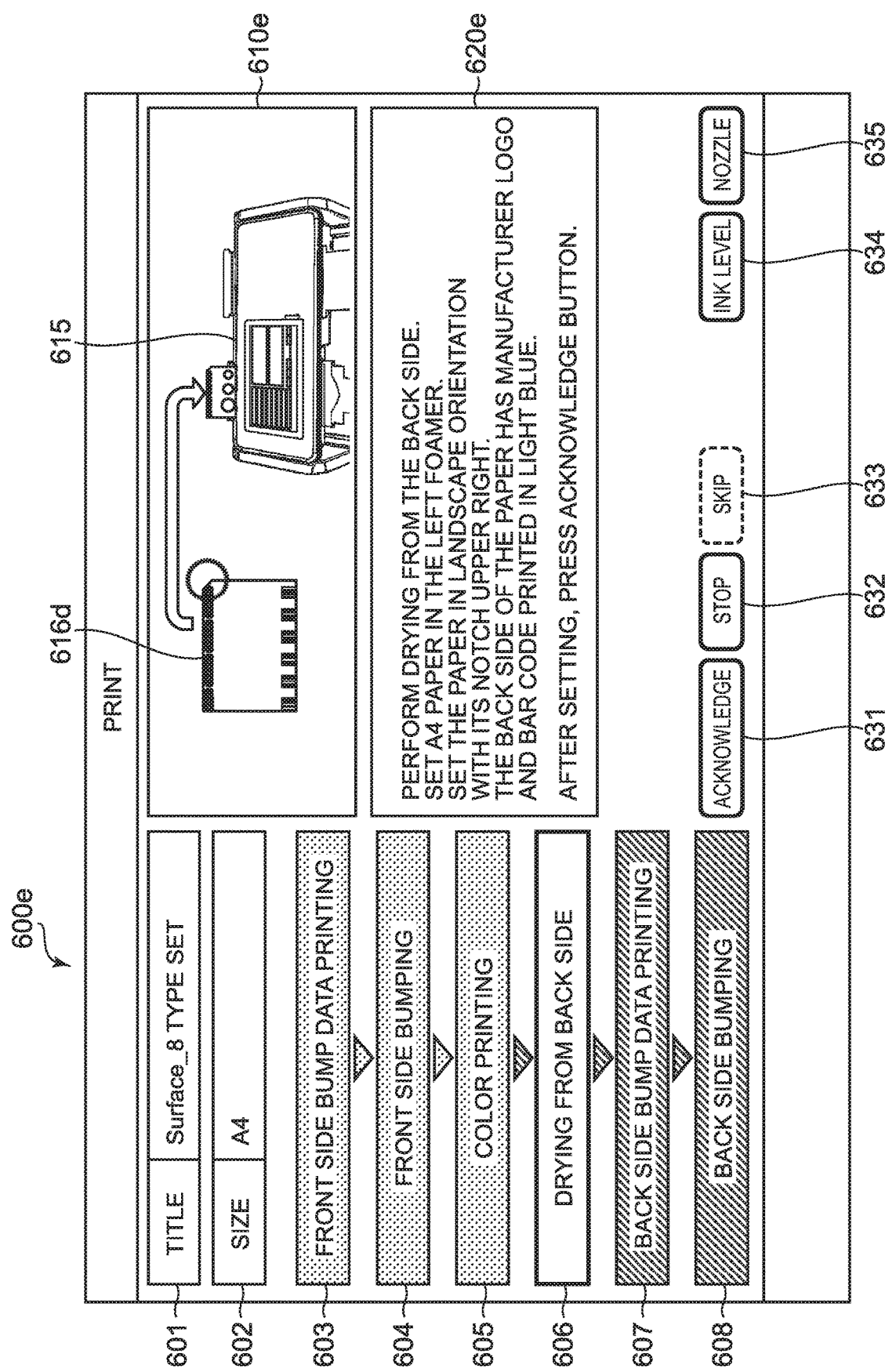
FIG. 11 is a diagram illustrating an example of the screen of the print panel in "drying from back side" operation.

FIG. 11 is a diagram illustrating an example of the screen of the print panel in the "drying from back side" operation.

The print panel 600e differs from the print panel 600d (FIG. 10) in that the "color printing" operation display 605 is hatched, the "drying from back side" operation display 606 is not hatched and displayed in white background, and the guidance image 610d and the guidance description image 620d are changed respectively to a guidance image 610e and a guidance description image 620e.

The guidance image 610e includes the shaping system image 615, a thermal expansion sheet image 616d on the left, and an arrow image indicating to place the thermal expansion sheet 400 in the paper feed part 220 (FIG. 2) of the expansion device 200. The thermal expansion sheet image 616d differs from the other thermal expansion sheet images 616a (FIG. 8), 616b (FIG. 9), and 616c (FIG. 10) in that it includes a bar code.

The guidance description image 620e includes a character string "Perform drying from the back side. Set A4 paper in the left foamer. Set the paper in landscape orientation with its notch upper right. The back side of the paper has manufacturer logo and bar code printed in light blue. After setting, press acknowledge button."

The character string "Set the paper in landscape orientation with its notch upper right. The back side of the paper has manufacturer logo and bar code printed in light blue." indicates to apply near infrared light to the other side (the base material 415 side) of the thermal expansion sheet 400.

When the "acknowledge" button 631 (FIG. 11) is pressed in S21, the drying control process 22 lights the halogen lamp 215 (FIG. 2) of the expansion device 200 to dry the thermal expansion sheet 400.

After S21, the 2D image formation control process 21 instructs the 2D image formation device 250 to perform black gradation printing on the back side of the thermal expansion sheet 400 (S23). In detail, the 2D image formation control process 21 causes the display operation part 150 to display a print panel 600f (FIG. 12), and the 2D image formation device 250 to perform printing.

Figure 12:
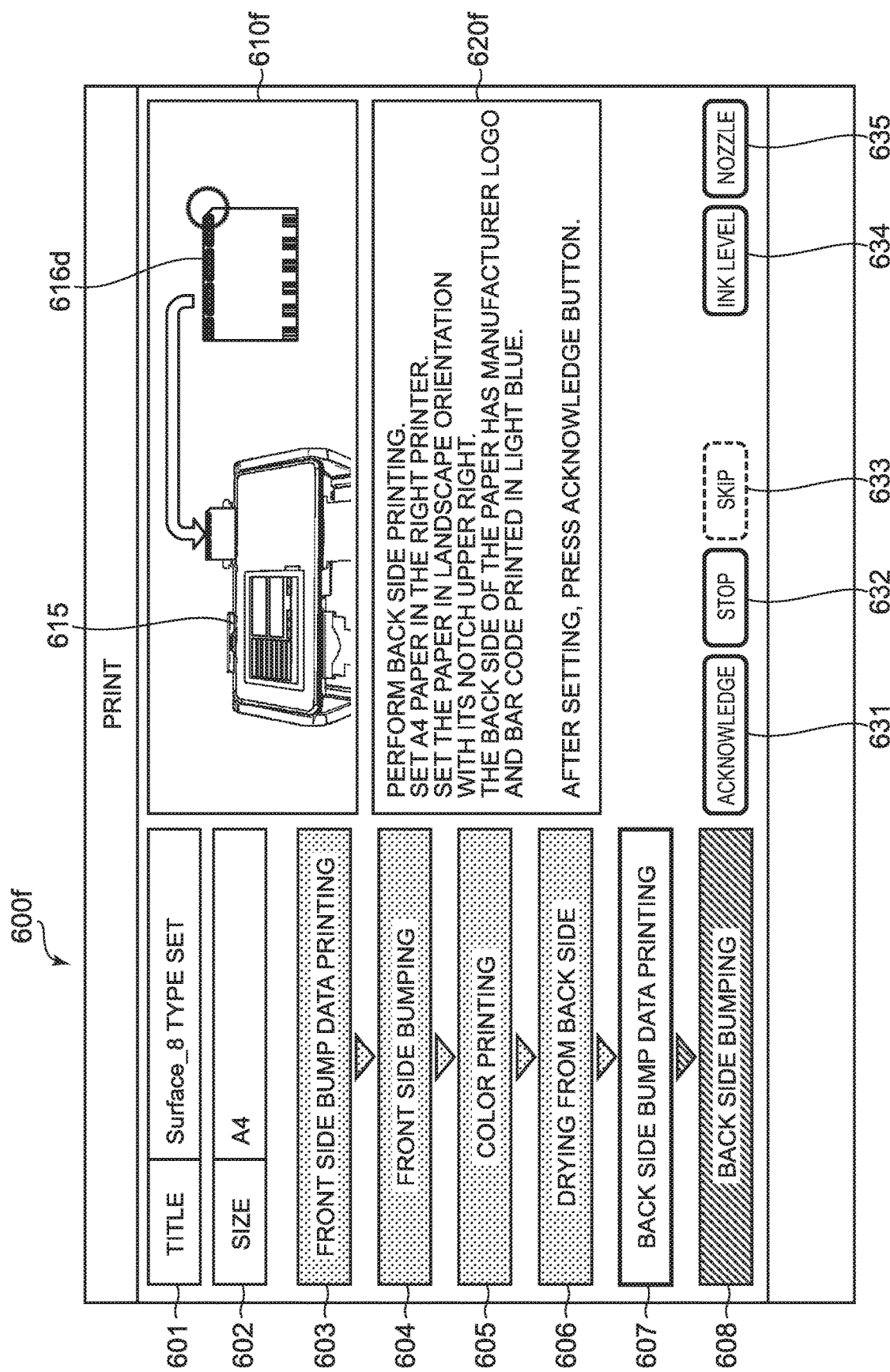
FIG. 12 is a diagram illustrating an example of the screen of the print panel in "back side bump data printing" operation.

FIG. 12 is a diagram illustrating an example of the screen of the print panel in the "back side bump data printing" operation.

The print panel 600f differs from the print panel 600e (FIG. 11) in that the "drying from back side" operation display 606 is hatched, the "back side bump data printing" operation display 607 is not hatched and displayed in white background, and the guidance image 610e and the guidance description image 620e are changed respectively to a guidance image 610f and a guidance description image 620f.

The guidance image 610f includes the shaping system image 615, the thermal expansion sheet image 616d on the right, and an arrow image indicating to insert the thermal expansion sheet 400 in 1. paper guide (FIG. 7). The guidance description image 620f includes a character string "Perform back side printing. Set the paper in landscape orientation with its notch upper right. The back side of the paper has manufacturer logo and bar code printed in light blue. After setting, press acknowledge button."

The character string "Perform back side printing. Set the paper in landscape orientation with its notch upper right. The back side of the paper has manufacturer logo and bar code printed in light blue." indicates to print the other side (the base material 415 side) of the thermal expansion sheet 400.

When the "acknowledge" button 631 (FIG. 12) is pressed in S23, the 2D image formation device 250 performs black gradation printing on the back side of the thermal expansion sheet 400.

After S23, the expansion control process 23 instructs the expansion device 200 (FIG. 1) to perform expansion conveyance with the back side up (S25). The process then ends. In detail, the expansion control process 23 causes the display operation part 150 to display a print panel 600g (FIG. 13), and the expansion device 200 to perform expansion conveyance.

Figure 13:
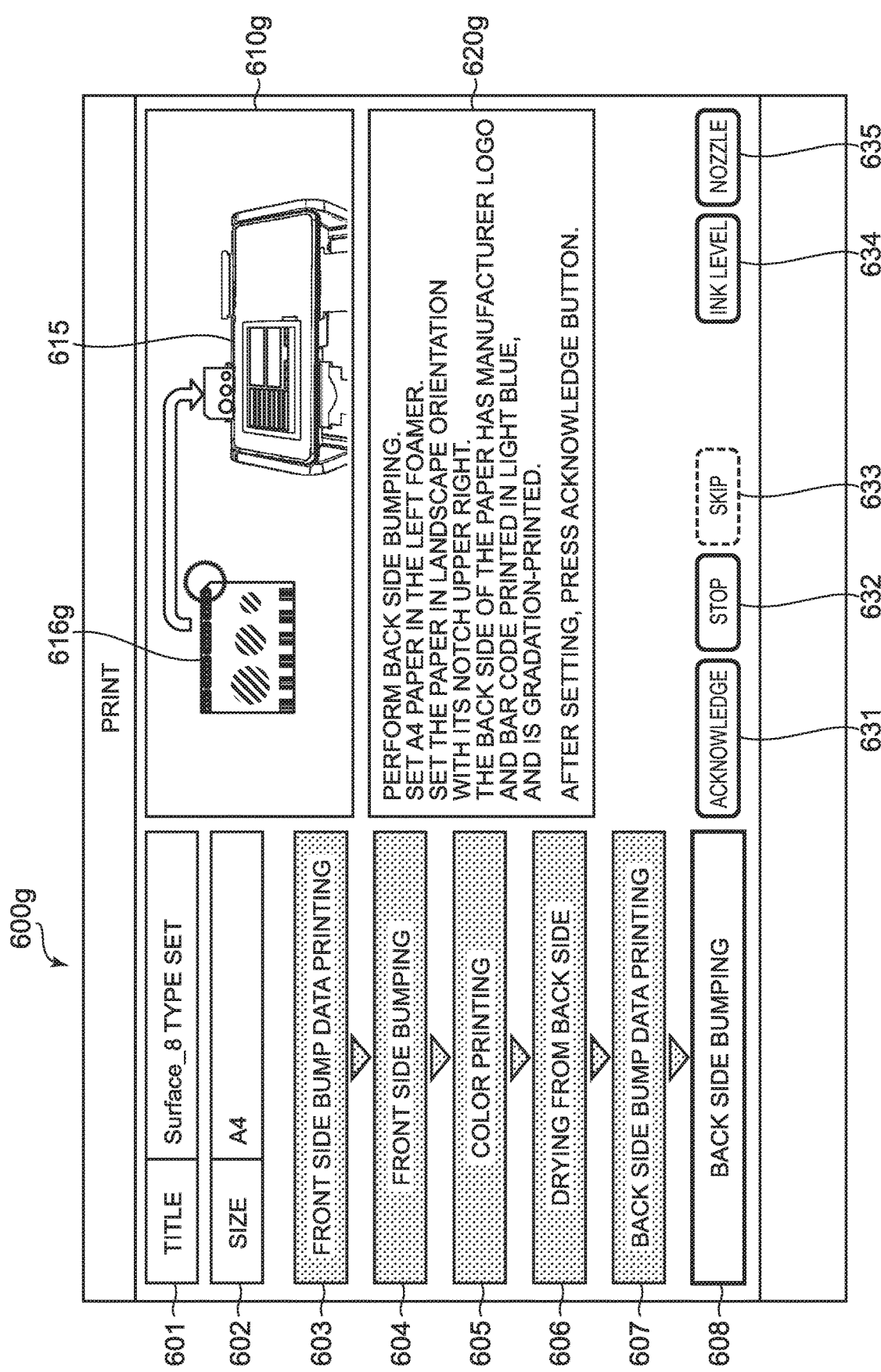
FIG. 13 is a diagram illustrating an example of the screen of the print panel in "back side bumping" operation.

FIG. 13 is a diagram illustrating an example of the screen of the print panel in the "back side bumping" operation. The print panel 600g differs from the print panel 600f (FIG. 12) in that the "back side bump data printing" operation display 607 is hatched, the "back side bumping" operation display 608 is not hatched and displayed in white background, and the guidance image 610f and guidance description image 620f are changed respectively to a guidance image 610g and a guidance description image 620g.

The guidance image 610g includes the shaping system image 615, a thermal expansion sheet image 616g on the left, and an arrow image indicating to place the thermal expansion sheet 400 in the paper feed part 220 (FIG. 2) of the expansion device 200. The guidance description image 620g includes a character string "Perform back side bumping. Set A4 paper in the left foamer. Set the paper in landscape orientation with its notch upper right. The back side of the paper has manufacturer logo and bar code printed in light blue, and is gradation-printed. After setting, press acknowledge button."

The character string "Perform back side bumping." indicates to expand the back side of the thermal expansion sheet 400. The character string "Set the paper in landscape orientation with its notch upper right. The back side of the paper has manufacturer logo and bar code printed in light blue" indicates to apply near infrared light to the other side (the thermal expansion layer 410 side) of the thermal expansion sheet 400.

In the case of determining that black ink (K) is not used (black ink is not included) in S19 (S19: "NO"), the 2D image formation control process 21 (FIG. 1) instructs the 2D image formation device 250 to perform black gradation printing on the back side of the thermal expansion sheet 400 (S27). In detail, the 2D image formation control process 21 causes the display operation part 150 to display the print panel 600f (FIG. 12), and the 2D image formation device 250 to perform printing using black ink.

After S27, the drying control process 22 (FIG. 1) causes the expansion device 200 (FIG. 1) to perform drying conveyance with the front side up, to remove excess ink moisture on the thermal expansion sheet 400 (S29). After S29, the expansion control process 23 causes the expansion device 200 to perform expansion conveyance with the back side up (S31). The process then ends. In detail, the expansion control process 23 causes the display operation part 150 to display the print panel 600g (FIG. 13), and the expansion device 200 to perform expansion conveyance.

(Modifications)

The present invention is not limited to the foregoing embodiment. Various modifications such as the following are possible.

(1) Although the shaping system 1000 performs black gradation printing on the front side of the thermal expansion sheet 400 (S15) and then expands (foams) the thermal expansion layer 410 with the front side up (S16) in the foregoing embodiment, the shaping system 1000 may perform black gradation printing on the front side of the thermal expansion sheet 400 and then perform drying with the back side up.

Figure 15:
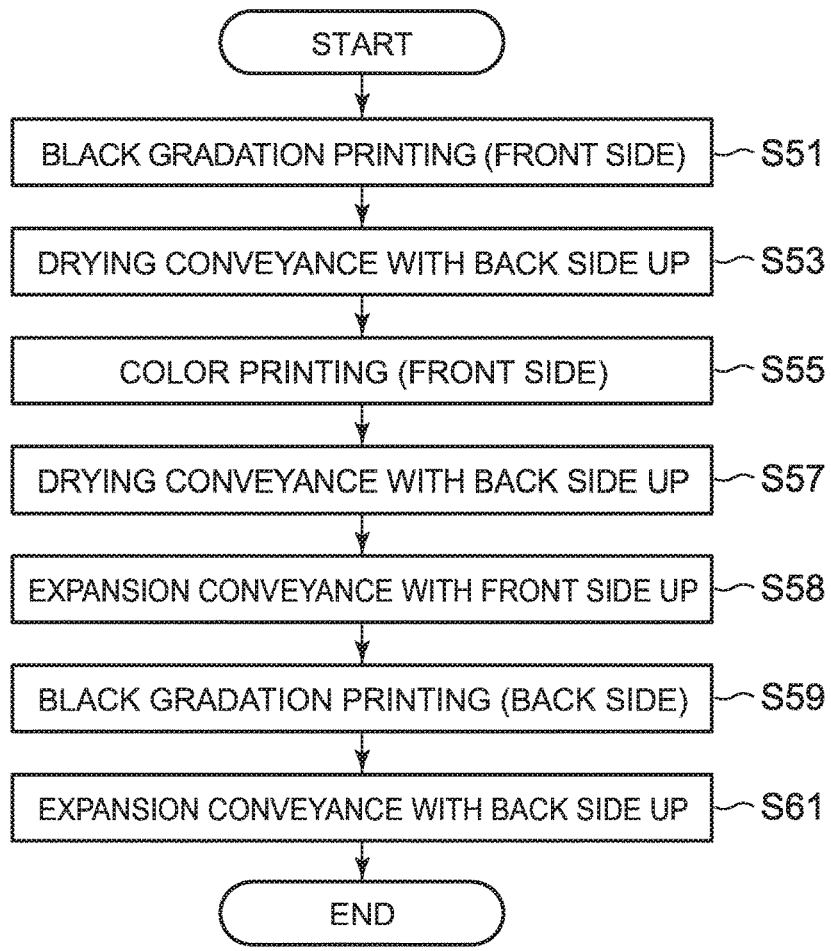
FIG. 15 is a flowchart illustrating the operation of a 2D image formation system according to a first modification.

FIG. 15 is a flowchart illustrating the operation of a 2D image formation system according to a first modification.

The 2D image formation control process 21 causes the 2D image formation device 250 to perform gradation printing using black (K) on the front side of the thermal expansion sheet 400 (S51). Next, the drying control process 22 performs drying conveyance with the back side of the thermal expansion sheet 400 up (S53). After S53, the 2D image formation control process 21 causes the 2D image formation device 250 to perform color printing of CMY on the front side of the thermal expansion sheet 400 (S55). After S55, the drying control process 22 again performs drying conveyance with the back side of the thermal expansion sheet 400 up (S57). After S57, the 2D image formation control process 21 performs expansion conveyance with the front side up (S58). As a result, the thermal expansion layer 410 expands in the site of the black gradation image formed in S51. After S58, the 2D image formation control process 21 causes the 2D image formation device 250 to perform gradation printing of black (K) on the back side of the thermal expansion sheet 400 (S59). After S59, the expansion control process 23 performs expansion conveyance with the back side of the thermal expansion sheet 400 up, to expand the thermal expansion sheet 400 from the back side (S61).

(2) Although the shaping system 1000 performs color printing in the foregoing embodiment, the shaping system 1000 may only perform gradation printing of black (K) on the front side of the thermal expansion sheet 400.

Figure 16:
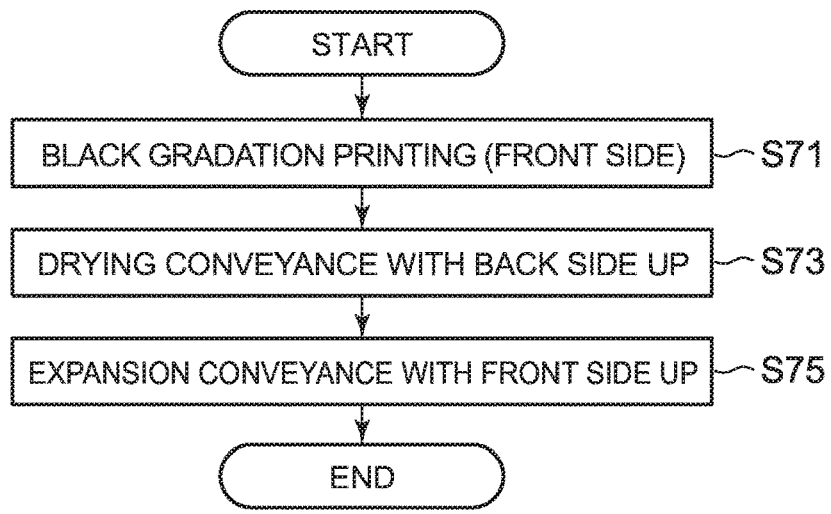
FIG. 16 is a flowchart illustrating the operation of a 2D image formation system according to a second modification.

FIG. 16 is a flowchart illustrating the operation of a 2D image formation system according to a second modification.

The 2D image formation control process 21 causes the 2D image formation device 250 to perform gradation printing of black (K) on the front side of the thermal expansion sheet 400 (S71). Next, the drying control process 22 performs drying conveyance with the back side of the thermal expansion sheet 400 up (S73). The drying is performed with such temperature that does not cause the thermal expansion layer 410 to expand (foam) or such conveyance speed that does not cause the thermal expansion layer 410 to expand (foam). By adjusting the temperature or the conveyance speed in this way, the non-expansion state of the thermal expansion layer 410 is maintained. After S73, the expansion control process 23 performs expansion conveyance with the front side of the thermal expansion sheet 400 up, to expand the thermal expansion sheet 400 from the front side (S75).

(3) Although only black gradation printing is performed on the front side in the second modification, color printing may be further performed on the front side.

Figure 17:
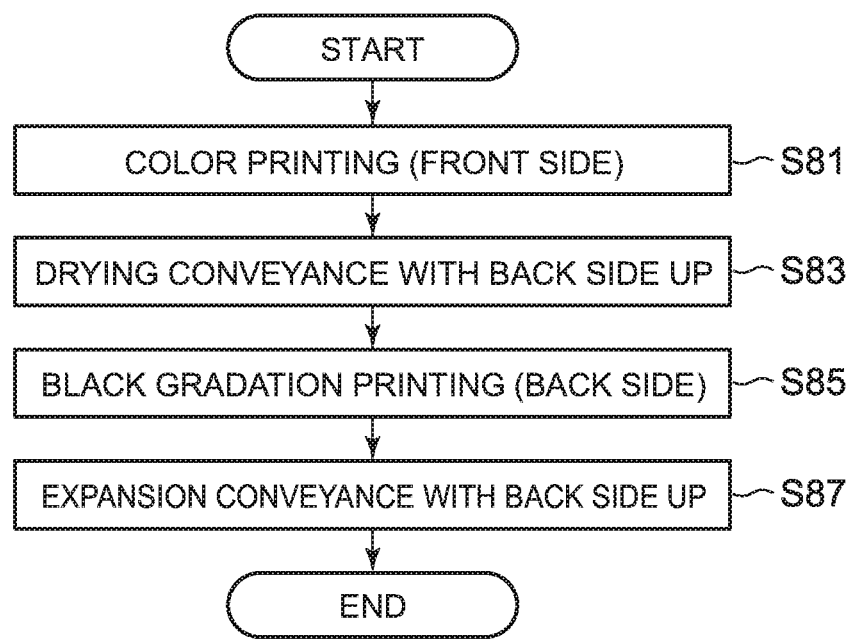
FIG. 17 is a flowchart illustrating the operation of a 2D image formation system according to a third modification.

FIG. 17 is a flowchart illustrating the operation of a 2D image formation system according to a third modification.

The 2D image formation control process 21 causes the 2D image formation device 250 to perform color printing of CMYK on the front side of the thermal expansion sheet 400 (S81). Next, the drying control process 22 performs drying conveyance with the back side of the thermal expansion sheet 400 up (S83). After S83, the 2D image formation control process 21 causes the 2D image formation device 250 to perform black gradation printing on the back side of the thermal expansion sheet 400 (S85). After S85, the expansion control process 23 performs expansion conveyance with the back side of the thermal expansion sheet 400 up, to expand the thermal expansion sheet 400 from the back side (S87).

(4) Although the shaping system 1000 performs black gradation printing on at least one of the front and back sides in the foregoing embodiment, the shaping system 1000 may perform only color printing of CMY. In detail, in the case where color printing of CMY is performed on the front side of paper as a medium, the image formation system only needs to perform a drying operation of heat-drying the medium from at least one of the front and back sides of the medium using the expansion device 200 as drying means.

In the case where the thermal expansion sheet 400 having the thermal expansion layer 410 on the front side (one side) is used as the medium, the image formation system only needs to execute a drying operation of heat-drying the medium by irradiation with near infrared light from at least one of the front and back sides of the thermal expansion sheet 400. Since ink (K) including carbon is not used in color printing of CMY, the image formation system can sufficiently dry the thermal expansion sheet 400 without expanding the thermal expansion layer 410 even when heat-drying from the front side.

In the case where the area of a printed 2D image is relatively large (i.e. the amount of ink used for printing is relatively large), to form a stereoscopic image with a sufficient expansion height, a corresponding large amount of heat needs to be applied to the expansion sheet. In particular, ink used for printing has not been sufficiently dried on the thermal expansion sheet immediately after printing, so that vaporization heat for vaporizing the ink is necessary. Thus, the ink needs to be dried to form a stereoscopic image with a sufficient expansion height.

In the present embodiment, the drying control process is performed after the image printing and before the expansion control process. The ink can thus be dried to sufficiently expand the thermal expansion sheet. The ink dried may be color ink or black ink.

What is claimed is:

1. A shaping system comprising:
   a printing device;
   an expansion device comprising a lamp; and
   a controller that is configured to control the printing device and the expansion device;
   wherein the controller is configured to:
   control the printing device to perform a first printing process of applying a first ink to a surface of a first side of a thermal expansion sheet having a thermal expansion layer on the first side, to print a first image on the surface of the first side;
   determine whether or not the first ink applied to the surface of the first side in the first printing process includes black ink;
   in a case in which it is determined that the first ink applied in the first printing process includes black ink:
      after having controlled the printing device to perform the first printing process, control the expansion device to perform a first drying process of irradiating, with the lamp, a surface of a second side of the thermal expansion sheet opposite the first side with an electromagnetic wave to an extent that allows the thermal expansion layer to maintain a non-expansion state, to dry the first image printed in the first printing process;
      after having controlled the expansion device to perform the first drying process, control the printing device to perform a second printing process of applying black ink to the surface of the second side of the thermal expansion sheet, to print a second image on the surface of the second side of the thermal expansion sheet; and
      after having controlled the printing device to perform the second printing process, control the expansion device to perform an expansion process of irradiating, with the lamp, the second image with an electromagnetic wave, to thermally expand the thermal expansion layer at a location corresponding to the second image; and
   in a case in which it is determined that the first ink applied in the first printing process does not include black ink:
      after having controlled the printing device to perform the first printing process of applying the first ink that does not include black ink to the surface of the first side of the thermal expansion sheet to form the first image, control the printing device to perform the second printing process of applying black ink to the surface of the second side of the thermal expansion sheet, to print the second image on the surface of the second side of the thermal expansion sheet;
      after having controlled the printing device to perform the second printing process, control the expansion device to perform a second drying process of irradiating, with the lamp, the surface of the first side of the thermal expansion sheet with an electromagnetic wave to an extent that allows the thermal expansion layer to maintain a non-expansion state, to dry the first image printed in the first printing process; and
      after having controlled the expansion device to perform the second drying process, control the expansion device to perform the expansion process of irradiating, with the lamp, the second image with an electromagnetic wave, to thermally expand the thermal expansion layer at the location corresponding to the second image.

2. The shaping system according to claim 1, wherein the black ink includes a material for converting the electromagnetic wave into heat.

3. A shaping system comprising:
   a printing device; and
   an expansion device comprising a lamp; and
   a controller that is configured to control the printing device and the expansion device:
   wherein the controller is configured to:
   control the printing device to perform a first printing process of applying black ink to a surface of a first side of a thermal expansion sheet having a thermal expansion layer on the first side, to print a first image on the surface of the first side;
   after having controlled the printing device to perform the first printing process, control the expansion device to perform a first drying process of irradiating a surface of a second side of the thermal expansion sheet opposite the first side with an electromagnetic wave to an extent that allows the thermal expansion layer to maintain a non-expansion state, to dry the first image formed on the surface of the first side;
   after having controlled the expansion device to perform the first drying process, control the printing device to perform a second printing process of applying an ink that does not include black ink to the surface of the first side of the thermal expansion sheet, to print a second image on the surface of the first side;
   after having controlled the printing device to perform the second printing process of applying the ink that does not include black ink to the surface of the first side of the thermal expansion sheet to print the second image, control the expansion device to perform a second drying process of irradiating the surface of the second side of the thermal expansion sheet opposite the first side with an electromagnetic wave to an extent that allows the thermal expansion layer to maintain a non-expansion state, to dry the second image formed on the surface of the first side; and
   after having controlled the expansion device to perform the second drying process, control the expansion device to perform an expansion process of irradiating the surface of the first side with an electromagnetic wave, to thermally expand the thermal expansion layer at a location corresponding to the first image.

4. The shaping system according to claim 3, wherein the ink that does not included black ink and that is applied in the second printing process is color ink.

* * * * *